United States Patent
Masuda

(10) Patent No.: US 10,651,779 B2
(45) Date of Patent: May 12, 2020

(54) ELECTRIC LINEAR MOTION ACTUATOR

(71) Applicant: NTN CORPORATION, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/281,529

(22) Filed: Feb. 21, 2019

(65) Prior Publication Data

US 2019/0181789 A1  Jun. 13, 2019

Related U.S. Application Data

(63) Continuation of application No. PCT/JP2017/029680, filed on Aug. 18, 2017.

(30) Foreign Application Priority Data

Aug. 24, 2016 (JP) ................. 2016-163589

(51) Int. Cl.
*H02P 29/028* (2016.01)
*B60T 8/17* (2006.01)
(Continued)

(52) U.S. Cl.
CPC .............. *H02P 29/028* (2013.01); *B60T 8/17* (2013.01); *B60T 13/74* (2013.01); *B60T 17/18* (2013.01);
(Continued)

(58) Field of Classification Search
USPC ................... 318/38, 119, 135, 687
See application file for complete search history.

(56) References Cited

U.S. PATENT DOCUMENTS 3,593,092 A * 7/1971 Flippo .................. G05D 1/0077
318/564
5,086,900 A * 2/1992 Kikuta .................... E05B 81/25
192/141
(Continued)

FOREIGN PATENT DOCUMENTS

JP  2000-25592   1/2000
JP  2000-507333  6/2000
(Continued)

OTHER PUBLICATIONS

International Search Report dated Nov. 7, 2017 in corresponding International Application No. PCT/JP2017/029680.
(Continued)

*Primary Examiner* — Bentsu Ro

(57) ABSTRACT

In this electric linear motion actuator, a linear motion mechanism and an electric motor are arranged in line along the same axis, which is an axis of a rotation input/output shaft of the linear motion mechanism. The electric motor includes a stator and a rotor which are arranged such that the directions of magnetic poles thereof for generating inter-linkage magnetic flux contributing to a torque are parallel to a rotation shaft of a motor. The rotor has torque generating surfaces at both faces in the axial direction thereof. The stator has first and second excitation mechanisms arranged on both sides in the axial direction of the rotor. The first and second excitation mechanisms have independent first and second system coil groups. A power supply system for independently supplying power to the first and second system coil groups is provided.

5 Claims, 4 Drawing Sheets

(51) Int. Cl.

| | | |
|---|---|---|
| *B60T 17/18* | (2006.01) | |
| *F16D 65/18* | (2006.01) | |
| *B60T 13/74* | (2006.01) | |
| *F16H 19/02* | (2006.01) | |
| *H02P 29/032* | (2016.01) | |
| *H02K 1/27* | (2006.01) | |
| *H02K 7/06* | (2006.01) | |

(52) U.S. Cl.
CPC ............ *F16D 65/18* (2013.01); *F16H 19/02* (2013.01); *H02K 1/2793* (2013.01); *H02K 7/06* (2013.01); *H02P 29/032* (2016.02)

(56) References Cited

U.S. PATENT DOCUMENTS

| | | |
|---|---|---|
| 6,197,097 B1 | 1/2001 | Schumann |
| 6,211,591 B1* | 4/2001 | Kowalski ................ B25B 21/00 310/112 |
| 6,911,795 B2 | 6/2005 | Matsuoka et al. |
| 7,336,007 B2* | 2/2008 | Chitayat ................ H02K 21/14 310/12.07 |
| 8,040,093 B2 | 10/2011 | Atarashi |
| 2004/0113575 A1 | 6/2004 | Matsuoka et al. |
| 2009/0033258 A1 | 2/2009 | Atarashi |
| 2009/0091287 A1* | 4/2009 | Bastholm ............ F16H 25/2015 318/603 |
| 2009/0167214 A1* | 7/2009 | Masuo ..................... B23Q 5/40 318/14 |

FOREIGN PATENT DOCUMENTS

| | | |
|---|---|---|
| JP | 2003-247576 | 9/2003 |
| JP | 2004-201364 | 7/2004 |
| JP | 2008-172884 | 7/2008 |
| JP | 2009-38934 | 2/2009 |
| JP | 2010-270788 | 12/2010 |
| JP | 2013-212814 | 10/2013 |
| JP | 2013-221531 | 10/2013 |

OTHER PUBLICATIONS

English Translation by WIPO of the International Preliminary Report on Patentability dated Mar. 7, 2019 in corresponding International Patent Application No. PCT/JP2017/029680 (9 pages).

* cited by examiner

ELECTRIC LINEAR MOTION ACTUATOR

CROSS REFERENCE TO THE RELATED APPLICATION

This application is a continuation application, under 35 U.S.C. § 111(a), of international application No. PCT/JP2017/029680, filed Aug. 18, 2017, which is based on and claims Convention priority to Japanese patent application No. 2016-163589, filed Aug. 24, 2016, the entire disclosure of which is herein incorporated by reference as a part of this application.

BACKGROUND OF THE INVENTION

Field of the Invention

The present invention relates to an electric linear motion actuator applicable to an electric brake device, for example.

Description of Related Art

Electric actuators and electric motors are suggested in the following documents:
1. an electric disk brake device in which, on the outer circumference of a linear motion part, an electric motor is disposed coaxially with the linear motion part (Patent Document 1);
2. an electric brake device in which an electric motor is disposed on a shaft that is different from a rotation shaft of a linear motion mechanism and is parallel with the rotation shaft (Patent Document 2);
3. a double stator type axial gap motor having eight poles and nine slots (Patent Document 3); and
4. a radial gap motor having two systems of windings disposed in the circumferential direction (Patent Document 4).

RELATED DOCUMENT

Patent Document

[Patent Document 1] JP Laid-open Patent Publication No. 2003-247576
[Patent Document 2] JP Laid-open Patent Publication No. 2010-270788
[Patent Document 3] JP Laid-open Patent Publication No. 2008-172884
[Patent Document 4] JP Laid-open Patent Publication No. 2004-201364

As for an electric brake device using an electric linear motion actuator as described in Patent Documents 1 and 2, the mounting space thereof on a vehicle is extremely limited, and the function of the device needs to be implemented with as much space-saving as possible. Meanwhile, in wheel speed control or the like, which is representatively exemplified as an antilock brake system (abbreviated as ABS), high-speed and high-precision control of braking force is required for an electric brake.

In a structure in which an electric motor is disposed on the outer circumference of an actuator as described in, for example, Patent Document 1, an increase in the rotor diameter of the electric motor may cause an increase in the moment of inertia, which may degrade responsiveness and control accuracy. On the other hand, since the kinetic energy required for rotation of the rotor is proportional to the moment of inertia, instantaneous maximum power consumption is increased to realize high-speed response, which may cause an increase in the cost of a power supply device for supplying power. Meanwhile, in an electric disk brake device, for example, the temperature of an object, such as a friction pad, pressurized by an actuator becomes extremely high. In this case, durability may become a problem because the electric motor is located near a heat source.

In a case where an electric motor and a linear motion actuator are disposed in parallel to each other as described in, for example, Patent Document 2, the electric motor and the linear motion actuator generally have cylindrical appearances, and the two cylinders thereof are disposed adjacent to each other, which may cause a certain dead space in a gap therebetween. Furthermore, a coupling mechanism such as a parallel gear is required between the electric motor and the linear motion actuator, regardless of required specifications, which may cause an increase in cost. In addition, since each of the electric motor and the linear motion actuator requires a support structure, the space and cost for the support structures may become a problem.

As a motor structure which attains a high torque while saving space, an axial gap type synchronous motor as described in, for example, Patent Document 3, has been known. However, in general, an axial gap motor is likely to have a smaller dimension in the rotation shaft direction while having a greater dimension in the radial direction. Therefore, when the axial gap motor is applied to, for example, an actuator having the structure of Patent Document 1 or Patent Document 2, the occupation space thereof may consequently increase. For example, when the axial gap motor is applied to the structure of Patent Document 1, the outer diameter may be locally and excessively increased. When the axial gap motor is applied to the structure of Patent Document 2, if the outer circumference of the electric motor is increased, the inter-axis distance between the motor and the actuator may be increased, which may cause an increase in dead space.

Meanwhile, there is a case where very high redundancy is required in an electric linear motion actuator applied to an electric brake device, as described in Patent Document 1 or Patent Document 2, for example. In this case, for example, regarding an electric motor as described in Patent Document 4 in which redundancy is improved by multiplexing the winding system, when a plurality of systems of windings of a radial gap motor are drawn out, the internal wiring structure is complicated, which may cause an increase in cost or space. In addition, the complicated windings may cause a deterioration in space factor.

SUMMARY OF THE INVENTION

An object of the present invention is to provide an electric linear motion actuator capable of achieving space saving and cost reduction, and improving redundancy.

Hereinafter, in order to facilitate understanding of the present invention, the present invention will be described with reference to the reference numerals used in embodiments for the sake of convenience.

An electric linear motion actuator 1 according to the present invention is an electric linear motion actuator including: an electric motor 2; a linear motion mechanism 3 having a rotation input/output shaft 5 and configured to convert rotary motion of the electric motor 2 to linear motion of a linear motion portion 6 via the rotation input/output shaft 5; and a control device CU configured to control the electric motor 2. The linear motion mechanism 3 and the electric motor 2 are arranged in line along the same axis, which is an axis of the rotation input/output shaft 5 of the linear motion mechanism 3. The electric motor 2 includes a stator 7 and a rotor 8 which are arranged such that directions of magnetic poles thereof for generating interlinkage magnetic flux contributing to generating a torque are parallel to a rotation shaft of the electric motor 2. The rotor 8 has respective torque generating surfaces at both faces in an axial direction of the rotor 8. The stator 7 has a plurality of excitation mechanisms 7A, 7B arranged on both sides in the axial direction of the rotor 8, respectively. The plurality of excitation mechanisms 7A, 7B include independent coil groups 11A, 11B in such a manner that one or more systems of the independent coil groups 11A, 11B are provided for one excitation mechanism 7A (7B) in the axial direction, and thus two or more systems of the independent coil groups 11A, 11B are provided in total for both the excitation mechanisms 7A, 7B in the axial direction. A power supply system 50 configured to independently supply power to the independent coil groups 11A, 11B is provided.

The "independent coil groups 11A, 11B" mean that the currents flowing through the respective coil groups 11A, 11B can be controlled by the control device CU (in other words, the excitation magnetic fluxes of the excitation mechanisms 7A, 7B can be independently controlled by the control device CU), and that the coil groups 11A, 11B on both sides in the axial direction are structurally separated from each other. To "independently supply power" means that, even when abnormality occurs in the power supply system or the transmission system that supplies power to one coil group 11A (11B) and thus power cannot be supplied to the one coil group 11A (11B), it is possible to supply power to the other coil group 11B (11A) as long as the power supply system and the transmission system that supply power to the other coil group 11B (11A) are normal.

According to this configuration, the electric motor 2 is a so-called axial gap motor including the stator 7 and the rotor 8 which are arranged such that the directions of magnetic poles thereof for generating interlinkage magnetic flux contributing to a torque or contributing to generating a torque are parallel to the rotation shaft of the electric motor 2. Furthermore, the linear motion mechanism 3 and the electric motor 2 are arranged in line along the same axis, which is the axis of the rotation input/output shaft 5 of the linear motion mechanism 3. This configuration has less wasteful space as compared with a configuration in which an electric motor and a linear motion actuator are arranged parallel to each other, for example, and thus space saving is achieved. In addition, an electric linear motion actuator having reduced moment of inertia and high responsiveness can be achieved.

This electric motor 2 is a so-called double stator type axial gap motor in which the rotor 8 has torque generating surfaces at both faces in the axial direction of the rotor 8, and the stator 7 has a plurality of excitation mechanisms 7A, 7B arranged on both sides in the axial direction of the rotor 8. This double stator type axial gap motor can achieve an increase in torque density and a reduction in moment of inertia, and thus is considered to be useful.

The plurality of excitation mechanisms 7A, 7B include independent coil groups 11A, 11B in such a manner that one or more systems of the independent coil groups 11A, 11B are provided for one excitation mechanism 7A (7B) in the axial direction, and thus two or more systems of the independent coil groups 11A, 11B are provided in total for both the excitation mechanisms 7A, 7B in the axial direction. Since the power supply system 50 independently supplies power to the independent coil groups 11A, 11B, redundancy is advantageously improved. For example, even when power cannot be supplied to the one coil group 11A (11B), it is possible to apply a desired axial load to the linear motion portion 6 by supplying power to the other coil group 11B (11A). Furthermore, since the one excitation mechanism 7A (7B) in the axial direction and the other excitation mechanism 7B (7A) in the axial direction are structurally separated from each other in the axial direction in advance, wiring can be drawn out from each of the respective excitation mechanisms 7A, 7B. Thus, each excitation mechanism 7A, 7B can be implemented with a simple configuration.

The control device CU may include a motor power abnormality determination section 54 configured to determine whether or not a state of power supply to each excitation mechanism 7A, 7B is normal, on the basis of a predetermined relationship of current and voltage in the excitation mechanism 7A, 7B. The predetermined relationship is a relationship of current and voltage, which is optionally determined through design or the like. An appropriate relationship thereof is obtained and determined through either or both of a test and a simulation, for example. In this case, the motor power abnormality determination section 54 can accurately determine whether or not the state of power supply to each excitation mechanism 7A, 7B is normal, on the basis of the predetermined relationship of current and voltage in the excitation mechanisms 7A, 7B.

The motor power abnormality determination section 54 may determine whether or not the state of power supply to each excitation mechanism 7A, 7B is normal, on the basis of information including a comparison between a predetermined relationship of average current and average voltage in the plurality of excitation mechanisms 7A, 7B, and a predetermined relationship of current and voltage in each excitation mechanism 7A, 7B. The "predetermined relationship" of average current and average voltage in the plurality of excitation mechanisms 7A, 7B and the "predetermined relationship" of current and voltage in each excitation mechanism 7A, 7B are relationships optionally determined through design or the like. Appropriate relationships thereof are obtained and determined through either or both of a test and a simulation, for example.

In the abnormality determination regarding the state of power supply to each excitation mechanism 7A, 7B, gaps at both sides in the axial direction of the rotor 8 of the axial gap motor are often ununiform due to an influence of processing tolerance or the like. In addition, the gaps are likely to vary depending on the occurrence state of interlinkage magnetic flux. In this case, the excitation mechanism 7A (7B) on the side where the gap is small has a high induced voltage while the excitation mechanism 7B (7A) on the side where the gap is large has a low induced voltage, whereby the amount of an error from the predetermined result obtained through measurement or analysis in advance increases, which may result in undesirable determination that the power supply state is abnormal.

Therefore, the abnormality determination is determination as to whether or not the power supply state is normal, on the basis of both the predetermined relationship of average current and average voltage in the plurality of excitation mechanisms 7A, 7B and the predetermined relationship of current and voltage in each excitation mechanism 7A, 7B. In this case, the influence of variation of the gaps is not likely to appear as a result regarding the average current and the average voltage (collectively referred to as "average value"), and therefore, erroneous determination of abnormality can be avoided.

The control device CU may include: a power supply limitation/interruption function section 72 configured to, when the motor power abnormality determination section 54 has determined that the state of power supply to one excitation mechanism 7A (7B) is abnormal, limit or interrupt supply of power to the one excitation mechanism 7A (7B); and a complement function section 71 configured to complement a torque that is reduced due to the limitation or interruption of supply of power to the one excitation mechanism 7A (7B), by the other excitation mechanism 7B (7A) whose power supply state has been determined to be normal by the motor power abnormality determination section 54.

According to this configuration, when the state of power supply to one excitation mechanism 7A (7B) is determined to be abnormal, the power supply limitation/interruption function section 72 limits or interrupts supply of power to the one excitation mechanism 7A (7B). The complement function section 71 complements a torque that is reduced due to the limitation or interruption of supply of power to the one excitation mechanism 7A (7B), with the other excitation mechanism 7B (7A) whose power supply state has been determined to be normal. By complementing shortage of torque due to abnormality with the other excitation mechanism 7B (7A) as mentioned above, a desired axial load can be applied to the linear motion portion 6.

The control device CU may have an axial load estimating function section 60 configured to estimate a magnitude of an axial load caused by linear motion of the linear motion portion 6 of the linear motion mechanism 3. The power supply limitation/interruption function section 72 may limit a motor current so that a current applicable to the electric motor 2 is smaller than that in a case where the supply of power is not limited or interrupted, when the state of power supply to the one excitation mechanism 7A (7B) has been determined to be abnormal and the axial load estimated by the axial load estimating function section 60 is smaller than a predetermined magnitude.

The "predetermined magnitude" is a magnitude of an axial load optionally determined through design or the like. An appropriate magnitude is obtained and determined through either or both of a test and a simulation, for example.

In the torque complement process by the complement function section 71, driving only by the single-system motor, i.e., the double stator type axial gap motor, may cause unstable posture of the rotor 8 due to an electromagnetic force in the thrust direction. For example, since the restriction force to the rotor 8 is lower in the low load state where the axial load is lower, the posture of the rotor 8 is more likely to be unstable. Therefore, when the state of power supply to one excitation mechanism 7A (7B) is determined to be abnormal and the axial load estimated by the axial load estimating function section 60 is smaller than a predetermined magnitude, the power supply limitation/interruption function section 72 limits the motor current so that the current applicable to the electric motor 2 becomes smaller than that in the case where the supply of power is not limited or interrupted. Thus, instability of the posture of the rotor 8 can be reduced by reducing the motor current when the axial load is smaller than the predetermined magnitude.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
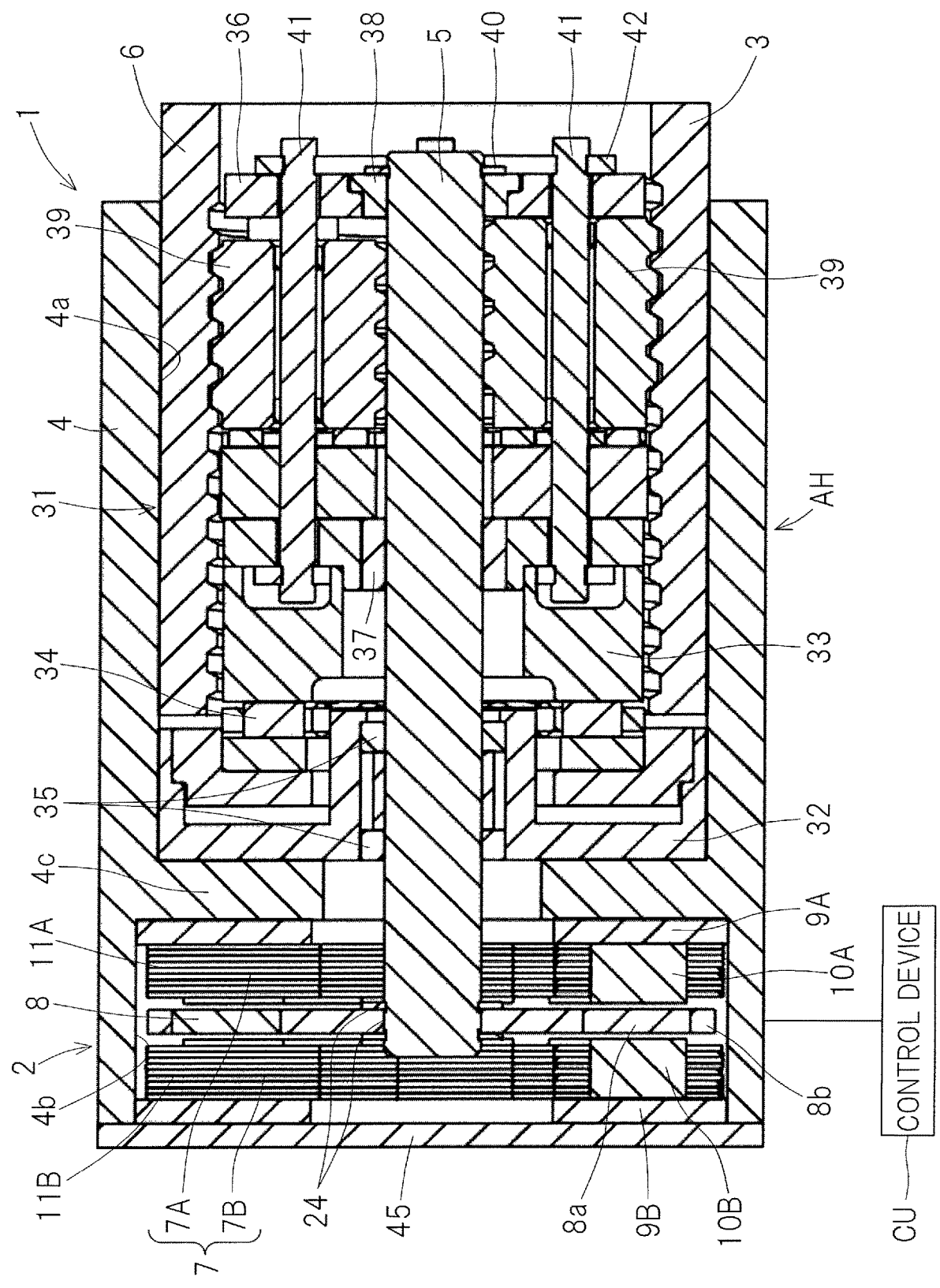
FIG. 1 is a longitudinal sectional view of an electric linear motion actuator according to one embodiment of the present invention.

An electric linear motion actuator according to one embodiment of the present invention will be described with reference to FIG. 1 and FIG. 2. This electric linear motion actuator is applied to an electric brake device (described later) mounted on a vehicle, for example. As shown in FIG. 1, an electric linear motion actuator 1 is obtained by connecting an electric motor 2 and a linear motion mechanism 3 in series in the axial direction. The linear motion mechanism 3 and the electric motor 2 are arranged in line along the same axis, which is an axis of a rotation input/output shaft 5 of the linear motion mechanism 3. The electric linear motion actuator 1 includes a linear motion actuator body AH and a control device CU described later.

The linear motion actuator body AH includes the electric motor 2, the linear motion mechanism 3, and a housing 4. The electric motor 2 of this embodiment is a double stator type axial gap motor. The linear motion mechanism 3 has a linear motion portion 6, and converts rotary motion of the electric motor 2 to linear motion of the linear motion portion 6 via the rotation input/output shaft 5. The housing 4 holds the linear motion mechanism 3 and the electric motor 2. Illustration of some components such as wiring is omitted for simplification in FIG. 1.

The electric motor 2 will be described. The electric motor 2 is a so-called axial gap type motor including a stator 7 and a rotor 8 which are arranged such that the directions of magnetic poles thereof for generating interlinkage magnetic flux contributing to a torque or contributing to generating a torque are parallel to a rotation shaft of the electric motor 2. The stator 7 is held statically with respect to the housing 4. The rotor 8 is held statically with respect to the rotation input/output shaft 5 of the linear motion mechanism 3, and generates a rotational torque by interlinkage magnetic flux between the rotor 8 and the stator 7 which is disposed spaced apart from the rotor 8. The rotor 8 is a magnetic field mechanism having respective torque generating surfaces at both surfaces thereof in the axial direction. The term "statically" means a relationship of having substantially synchronous motion (in other words, relative restriction), with the influence of a gap or the like being excluded.

The electric motor 2 is provided inside the cylindrical housing 4. The housing 4 includes: a linear motion mechanism housing portion 4a in which most of the linear motion mechanism 3 is housed; a motor housing portion 4b in which the electric motor 2 is housed; and a partition wall 4c separating the linear motion mechanism housing portion 4a and the motor housing portion 4b from each other. The motor housing portion 4b is provided on one axial end side in the housing 4, and the linear motion mechanism housing portion 4a is provided on the other axial end side in the housing 4.

The partition wall 4c is perpendicular to the axial direction of the rotation input/output shaft 5, and has, formed therein, a through hole in which the rotation input/output shaft 5 is inserted from the linear motion mechanism housing portion 4a to the motor housing portion 4b. While the electric motor 2 is housed in the motor housing portion 4b of the housing 4, a motor cover 45 is provided so as to cover an opening end, in the housing 4, on the electric motor 2 side (the one axial end side).

The stator 7 includes a pair of excitation mechanisms 7A, 7B which are arranged so as to face both sides of the rotor 8 in the axial direction, respectively. One of the excitation mechanisms 7A, 7B which is on the partition wall 4c side is the first excitation mechanism 7A, while the other one on the motor cover 45 side is the second excitation mechanism 7B. The first excitation mechanism 7A includes a plurality of magnetic body cores 10A, a back yoke 9A, and a first system coil group 11A. The second excitation mechanism 7B includes a plurality of magnetic body cores 10B, a back yoke 9B, and a second system coil group 11B.

The first excitation mechanism 7A will be described. In the motor housing portion 4b of the housing 4, the back yoke 9A is provided so as to abut on the partition wall 4c. The magnetic body cores 10A protrude from the back yoke 9A in the axial direction. The magnetic body cores 10A are provided at regular intervals in the circumferential direction. The magnetic body cores 10A are made of laminated steel plates or powder magnetic cores, for example. The first system coil group 11A is wound around each magnetic body core 10A.

The second excitation mechanism 7B will be described. In the motor housing portion 4b of the housing 4, the back yoke 9B is provided so as to abut on the motor cover 45. The magnetic body cores 10B protrude from the back yoke 9B in the axial direction. Similar to the magnetic body cores 10A, the magnetic body cores 10B are also provided at regular intervals in the circumferential direction. The second system coil group 11B is wound around each magnetic body core 10B. Other configurations of the magnetic body core 10B and the second system coil group 11B are identical to those of the magnetic body core 10A and the first system coil group 11A.

The magnetic body cores 10A and the magnetic body cores 10B, which are made of laminated steel plates, powder magnetic cores, or the like, improve torque per unit copper loss, and therefore are considered to be suitable. However, air-core coils, which effectively reduce the cost of components and torque variation, may be used without using magnetic body cores.

As for the winding method for the first and second system coil groups 11A, 11B, either partial winding or concentrated winding may be adopted. Currents that flow through the first and second system coil groups 11A, 11B can be independently controlled by the control device CU, and the first and second system coil groups 11A, 11B are structurally separated from each other in the axial direction. The first and second system coil groups 11A, 11B are referred to as mutually independent coil groups.

The rotor 8 is, for example, a disc-like member having a permanent magnet 8a, and a holding portion 8b which holds the permanent magnet 8a. The holding portion 8b is made of a non-magnetic material such as resin or stainless steel, for example. As described above, the stator 7 is configured as an excitation mechanism including the first and second system coil groups 11A, 11B, the rotor 8 is configured as a magnetic field mechanism using the permanent magnet 8a, and the electric motor 2 is configured as a permanent-magnet synchronous electric motor. This configuration is excellent in durability, torque density, etc., and is considered to be suitable for an electric linear motion actuator.

The rotor 8 is fixed to an end portion of the rotation input/output shaft 5 in the linear motion mechanism 3. In the example of FIG. 1, on an outer circumferential surface, of the rotation input/output shaft 5, at the end portion inserted in the motor housing portion 4b, the rotor 8 is positioned in the axial direction and fixed while being sandwiched between two retaining rings 24, 24. On the outer circumferential surface of the end portion of the rotation input/output shaft 5, annular grooves for fixing the two retaining rings 24, 24 are formed, respectively.

Accordingly, the rotor 8 is fixed by the retaining rings 24, 24, at an axial position corresponding to a space between the first excitation mechanism 7A and the second excitation mechanism 7B with respect to the rotation input/output shaft 5. The rotation shaft of the electric motor 2 is disposed coaxially with the rotation input/output shaft 5 of the linear motion mechanism 3. A positioning structure in the rotation shaft circumferential direction, which enables torque transmission from the rotor 8 to the rotation input/output shaft 5, can be realized by flattening, splines, fitting friction, welding, or the like, although illustration thereof is omitted.

The linear motion mechanism 3 will be described. Most of the linear motion mechanism 3 is incorporated in the linear motion mechanism housing portion 4a of the housing 4. The linear motion mechanism 3 applies a braking force to a brake rotor described later by output from the electric motor 2. The linear motion mechanism 3 converts rotary motion of the electric motor 2 to linear motion of the linear motion portion 6 via the rotation input/output shaft 5.

The linear motion mechanism 3 includes the rotation input/output shaft 5 which is rotationally driven by the electric motor 2, and a conversion mechanism part 31 which converts rotary motion of the rotation input/output shaft 5 to linear motion. The conversion mechanism part 31 includes: the linear motion portion 6; a bearing case 32; a back plate 33 which is an annular thrust plate; a thrust bearing 34 which holds a reaction force to an axial load, caused by the linear motion of the linear motion portion 6; radial bearings 35; a carrier 36; sliding bearings 37, 38; and planetary rollers 39.

The cylindrical linear motion portion 6 is supported by the inner circumferential surface of the linear motion mechanism housing portion 4a so as to be prevented from rotating and be movable in the axial direction. On the inner circumferential surface of the linear motion portion 6, a helical projection is helically formed so as to project in the radially inward direction. The plurality of planetary rollers 39 mesh with the helical projection.

The bearing case 32 is provided at one end side, in the axial direction, of the linear motion portion 6 in the linear motion mechanism housing portion 4a. The bearing case 32 includes a cylindrical boss portion and a flange portion, which extends radially outward from the boss portion. The plurality of radial bearings 35 are fitted in the boss portion, and the rotation input/output shaft 5 is fitted onto the inner diameter surface of an inner ring of each of the radial bearings 35. The rotation input/output shaft 5 is rotatably supported by the bearing case 32 through the plurality of radial bearings 35.

The carrier 36, which is rotatable around the rotation input/output shaft 5, is provided on the inner circumference of the linear motion portion 6. The carrier 36 is supported rotatably around the rotation input/output shaft 5, by the sliding bearings 37, 38 fitted between the carrier 36 and the rotation input/output shaft 5. A retaining ring 40, which restricts the axial positions of the rotation input/output shaft 5 and the carrier 36 with respect to the bearing case 32, is provided at an axial end portion of the rotation input/output shaft 5.

The carrier 36 includes a plurality roller shafts 41 spaced from each other in the circumferential direction. At opposite end portions of the carrier 36 in the axial direction, a plurality of shaft insertion holes are formed. Each shaft insertion hole is an oblong hole extending by a predetermined distance in the radial direction. Opposite end portions of each roller shaft 41 in the axial direction are inserted into the corresponding shaft insertion holes, whereby the roller shafts 41 are supported so as to be movable in the radial direction within the ranges of the respective shaft insertion holes. An elastic ring 42 is extended over the plurality of roller shafts 41 at the opposite end portions thereof in the axial direction so as to urge the roller shafts 41 in the radially inward direction.

The planetary rollers 39 are rotatably supported by the corresponding roller shafts 41. On an outer circumferential surface of each planetary roller 39, a circumferential groove or a helical groove is formed so as to mesh with the helical projection of the linear motion portion 6. Each planetary roller 39 is disposed between the outer circumferential surface of the rotation input/output shaft 5 and the inner circumferential surface of the linear motion portion 6. Each planetary roller 39 is pressed against the outer circumferential surface of the rotation input/output shaft 5 by the urging force of the elastic ring 42. When the rotation input/output shaft 5 is rotated by the electric motor 2, each planetary roller 39 which is in contact with the outer circumferential surface of the rotation input/output shaft 5 rotates due to contact friction therebetween. Thus, the linear motion portion 6 moves in the axial direction, whereby a friction pad 43 (FIG. 4) provided at an axially end portion of the linear motion portion 6 is brought into contact with or separated from a brake rotor 44 (FIG. 4).

The control device CU and the like will be described. FIG. 2 is a block diagram showing an example of a configuration of a control system for the electric linear motion actuator 1. As shown in FIG. 2, the control device CU is a device for controlling the electric motor 2, and includes an actuator load controller 53, a motor power abnormality determination section 54, an abnormality notificator 46, a current converter 55, a current controller 56, a control device power supply 47, an OR circuit 48, and a motor driver 57. The control device CU further includes a current estimator 58, an angle estimator 59, and an axial load estimator 60 which is an axial load estimating function section. To the control device CU, a plurality of power supply devices (in this embodiment, first and second power supply devices 49A, 49B) are connected.

The actuator load controller 53 obtains a motor torque required for following an estimated axial load of the linear motion mechanism 3 with respect to a load command value, and outputs a motor torque command value. The load command value is given from, for example, a higher-order control unit 61 of the control device CU, on the basis of an operation amount of a brake operating part such as a brake pedal (not shown). As the higher-order control unit 61, an electric control unit (ECU) that performs overall control of a vehicle is adopted, for example. The estimated axial load is obtained by, for example, the axial load estimator 60 described later.

Figure 4:
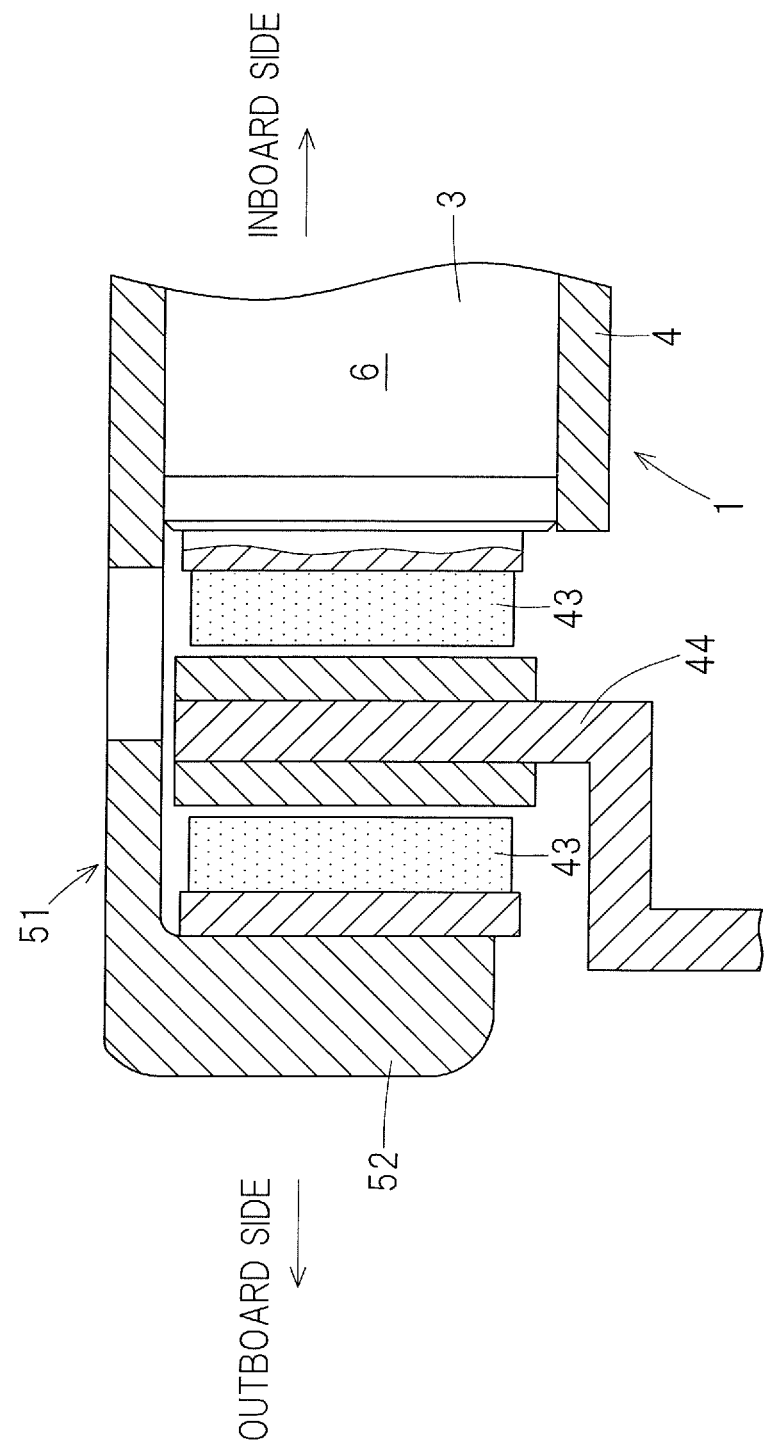
FIG. 4 is a partial longitudinal sectional view of an electric brake device provided with any of the above-mentioned electric linear motion actuators.

Specifically, the axial load estimator 60 can obtain the estimated axial load, on the basis of a sensor output from a load sensor 62 for detecting a pressing force when the linear motion portion 6 (FIG. 1) of the linear motion mechanism 3 causes the friction pad 43 (FIG. 4) to press the brake rotor 44 (FIG. 4). The load sensor 62 includes a magnetic sensor and a magnetic target, for example. When the friction pad 43 presses the brake rotor 44, a counterforce toward an inboard side acts on the linear motion portion 6 as shown in FIG. 4. When the electric brake device is mounted on a vehicle, terms "inboard" and "outboard" represent one side of the vehicle body close to the longitudinal center of the vehicle body and the other side of the vehicle body away from the longitudinal center of the vehicle body, respectively.

Figure 2:
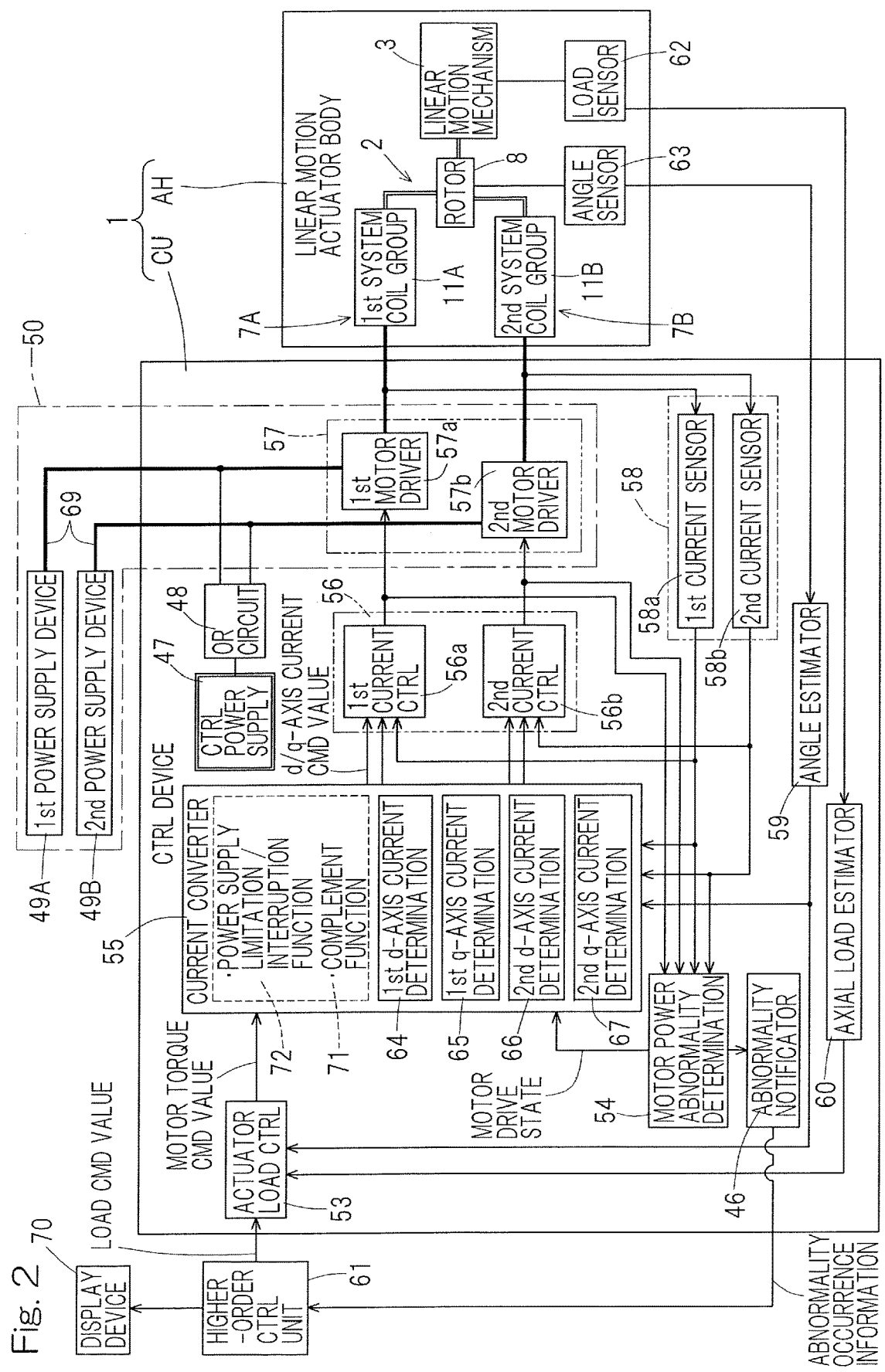
FIG. 2 is a block diagram showing an exemplary configuration of a control system for the electric linear motion actuator.

For example, the load sensor 62 shown in FIG. 2, which is composed of the magnetic sensor and the magnetic target, magnetically detects the counterforce, as a displacement amount in the axial direction. An optical type, eddy current type, or capacitance type sensor other than a magnetic type sensor may be adopted as the load sensor 62.

The axial load estimator 60 confirms the relationship between the sensor output from the load sensor 62 and the axial load (thrust force) of the linear motion mechanism 3 in advance through a test or the like, and sets the relationship on a table or the like, whereby the axial load estimator 60 can obtain the estimated axial load. The estimated axial load may be obtained from, for example, the relationship between a motor current estimated by the current estimator 58 and a motor angle estimated by the angle estimator 59.

The actuator load controller 53 obtains a motor torque required for following the estimated axial load with respect to the given load command value, by using feedback control, feedforward control, or the like according to need.

The current estimator 58 includes, for example, a first current sensor 58*a* for obtaining a motor current that flows in the first system coil group 11A, and a second current sensor 58*b* for obtaining a motor current that flows in the second system coil group 11B. Examples of the current sensors 58*a*, 58*b* include: a magnetic field detection type current sensor for detecting a magnetic field caused by a current; and a voltage measurement type current sensor for measuring a voltage across opposite ends of a shunt resistor, an FET, or the like. The angle estimator 59 can estimate an angle of the rotor 8 with respect to the stator 7, from the sensor output from the angle sensor 63. As the angle sensor 63, for example, a resolver, an encoder, or the like can be adopted.

The motor power abnormality determination section 54 determines whether or not the state of power supply (power supply state) to each of the first and second excitation mechanisms 7A, 7B is normal, on the basis of a predetermined relationship of current and voltage in the excitation mechanism 7A, 7B. When abnormality occurs in a power supply system 50 from the first and second power supply devices 49A, 49B to the motor driver 57, the power supply state is determined to be abnormal. For example, the power supply state is determined to be abnormal when a power line 69 or a power supply harness (not shown) between the first or second power supply device 49A, 49B and the motor driver 57 is broken, when short circuit occurs inside the motor driver 57, or when abnormality or the like occurs in the power supply device.

The motor power abnormality determination section 54 can diagnose whether or not the energized states of the first and second system coil groups 11A, 11B are normal. The motor power abnormality determination section 54 can diagnose it on the basis of a comparison between the relationship of current and voltage, which depends on, for example, coil inductance, coil resistance, induced voltage caused by rotor magnetic flux, rotor angular velocity, etc., and a predetermined result obtained through measurement or analysis in advance. In addition, when a harness, a connector, or the like is used, a breakage detection structure (not shown) may be additionally provided.

In the abnormality determination by the motor power abnormality determination section 54, gaps at both sides in the axial direction of the rotor 8 of the axial gap motor are often ununiform due to an influence of processing tolerance or the like. In addition, the gaps are likely to vary depending on the occurrence state of interlinkage magnetic flux. In this case, the excitation mechanism on the side where the gap is small has a high induced voltage while the excitation mechanism on the side where the gap is large has a low induced voltage. Then, the amount of an error from the predetermined result obtained through measurement or analysis in advance increases, which may result in undesirable determination that the power supply state is abnormal.

Therefore, the abnormality determination may have a function of determining whether or not the power supply state is normal, on the basis of both the predetermined relationship of average current and average voltage in the plurality of excitation mechanisms (first and second excitation mechanisms 7A, 7B) and the predetermined relationship of current and voltage in each excitation mechanism 7A (7B). In this case, the influence of variation of the gaps is not likely to appear as a result regarding the average current and the average voltage (collectively referred to as "average value"), and therefore, erroneous determination of abnormality can be avoided.

When the motor power abnormality determination section 54 has determined that the power supply state is abnormal, the abnormality notificator 46 outputs abnormality occurrence information to the higher-order control unit 61. Upon receiving the abnormality occurrence information from the abnormality notificator 46, the higher-order control unit 61 causes a display device 70, which is provided on, for example, a console panel of the vehicle, to notify that the electric motor 2 is abnormal.

The current converter 55 derives current command values to be applied to the first and second system coil groups 11A, 11B, in accordance with motor torque command values or the like calculated by the actuator load controller 53. The current converter 55 includes first d-axis/q-axis current determination sections 64, 65, and second d-axis/q-axis current determination sections 66, 67. The first d-axis/q-axis current determination sections 64, 65 derive a d-axis current command value and a q-axis current command value, respectively, to be applied to the first system coil group 11A. The second d-axis/q-axis current determination sections 66, 67 derive a d-axis current command value and a q-axis current command value, respectively, to be applied to the second system coil group 11B.

The current converter 55 may have a complement function section 71. When the motor power abnormality determination section 54 has determined that the state of power supply to one excitation mechanism 7A (7B) is abnormal and the state of power supply to the other excitation mechanism 7B (7A) is normal, the complement function section 71 complements shortage of torque caused by the abnormality, with the other excitation mechanism 7B (7A) whose power supply state is normal.

In the torque complement process by the complement function section 71, driving only by the single-system motor, i.e., the double stator type axial gap motor, may cause unstable posture of the rotor 8 due to an electromagnetic force in the thrust direction. For example, in the electric linear motion actuator 1 shown in FIG. 1, since the restriction force to the rotor 8 is lower in the low load state where the axial load is lower, the posture of the rotor 8 is more likely to be unstable. Therefore, as shown in FIG. 2, the current converter 55 may include a power supply limitation/interruption function section 72 which limits a torque (power supply) while allowing a reduction in responsiveness, except for a torque required for exerting a load.

That is, when the state of power supply to one excitation mechanism 7A (7B) is determined to be abnormal by the motor power abnormality determination section 54 and the axial load estimated by the axial load estimator 60 is smaller than a predetermined magnitude, the power supply limitation/interruption function section 72 limits the motor current so that the current applicable to the electric motor 2 becomes smaller than that in the case where the supply of power is not limited. Specifically, a d-axis current command value and a q-axis current command value to the first (second) system coil group 11A (11B) are derived so as to limit supply of power to the one excitation mechanism 7A (7B) determined to be abnormal, only when the axial load is smaller than the predetermined magnitude.

By limiting the motor current as described above, instability of the posture of the rotor 8 can be reduced. If a lookup table (abbreviated as LUT) or the like for appropriately referring to parameters including the axial load and the motor current estimated by the current estimator 58, is created in advance based on the result of analysis, test, or the like, the calculation load can be advantageously reduced when the limit value of the motor current is derived.

The current controller 56 includes first and second current controllers 56a, 56b. The first and second current controllers 56a, 56b output motor voltages for performing following control with respect to the current command value, on the basis of the current estimation results for the corresponding first and second system coil groups 11A, 11B, respectively. The calculation for outputting the motor voltages is executed while using feedback control or feedforward control as appropriate. The current of the first system coil group 11A is estimated by the first current sensor 58a. The current of the second system coil group 11B is estimated by the second current sensor 58b. The calculators including the aforementioned controller are implemented by, for example, microcomputer, FPGA, ASIC, etc., whereby inexpensive and high-performance control can be advantageously realized.

The motor driver 57 includes first and second motor drivers 57a, 57b. The first and second motor drivers 57a, 57b convert DC current of the corresponding first and second power supply devices 49A, 49B to three-phase AC power to be used in driving the electric motor 2. The power supply system 50 includes at least the first and second motor drivers 57a, 57b in the control device CU, the first and second power supply devices 49A, 49B, and the power lines 69 connecting the motor drivers 57a, 57b to the power supply devices 49A, 49B. The power supply system 50 has a function of independently supplying power to the aforementioned independent first and second system coil groups 11A, 11B, respectively.

When the control device power supply 47 is configured to be able to supply power to the first and second power supply devices 49A, 49B through the OR circuit 48 as long as one of the power supply devices 49A, 49B is normal, redundancy can be advantageously achieved. As the OR circuit 48, a diode OR circuit is adopted, for example.

The first motor driver 57a outputs AC power to the first system coil group 11A, and the second motor driver 57b outputs AC power to the second system coil group 11B. Each of the first and second motor drivers 57a, 57b may be configured as, for example, a half-bridge circuit using switching elements such as FETs, and PWM control may be adopted in which ON-OFF signals for a high-side switch and a low-side switch are supplied from the first and second current controllers 56a, 56b, respectively. In this case, inexpensive and highly accurate control can be advantageously achieved.

Specifically, the section, controllers, converters, and estimators included in the control device CU are configured by software functions on a processor (not shown) or hardware circuits that can output results by performing calculation using: LUTs (look up table) realized by software or hardware; or predetermined transform functions stored in a software library, hardware equivalent thereto, or the like; and, if necessary, comparison functions, four arithmetic operation functions in a library, hardware equivalent thereto, or the like.

According to the electric linear motion actuator 1 described above, the electric motor 2 is a so-called axial gap motor including the stator 7 and the rotor 8 which are arranged such that the directions of magnetic poles thereof for generating interlinkage magnetic flux contributing to a torque are parallel to the rotation shaft of the electric motor 2. Furthermore, the linear motion mechanism 3 and the electric motor 2 are arranged in line along the same axis, which is the axis of the rotation input/output shaft 5 of the linear motion mechanism 3. This configuration has less wasteful space as compared with a configuration in which an electric motor and a linear motion actuator are arranged parallel to each other, for example, and thus space saving is achieved. In addition, an electric linear motion actuator having reduced moment of inertia and high responsiveness can be achieved.

The electric motor 2 is a so-called double stator type axial gap motor in which the rotor 8 has the torque generating surfaces at both surfaces thereof in the axial direction, and the stator 7 has the plurality of excitation mechanisms 7A, 7B disposed at both sides of the rotor 8 in the axial direction. This double stator type axial gap motor can achieve an increase in torque density and a reduction in moment of inertia, and thus is considered to be useful.

The first and second excitation mechanisms 7A, 7B include the first and second system coil groups 11A, 11B independent from each other, respectively, and the power supply system 50 independently supplies power to the independent first and second system coil groups 11A, 11B, whereby redundancy can be advantageously improved. For example, even when power cannot be supplied to one coil group 11A (11B), a desired axial load can be applied to the linear motion portion 6 by supplying power to the other coil group 11B (11A). Furthermore, since the first and second excitation mechanisms 7A, 7B are structurally separated from each other in the axial direction in advance, wiring can be drawn out from each of the first and second excitation mechanisms 7A, 7B. Thus, each excitation mechanism 7A, 7B can be implemented with a simple configuration.

In the present embodiment, the first excitation mechanism 7A includes the first system coil group 11A, and the second excitation mechanism 7B includes the second system coil group 11B. However, the present invention is not limited to the aforementioned configuration. Each of the plurality of excitation mechanisms provided at both sides of the rotor 8 in the axial direction may include one or more systems of independent coil groups, so that two or more systems of independent coil groups may be provided in total for the excitation mechanisms at both sides of the rotor 8 in the axial direction. That is, the excitation mechanism provided at one side of the rotor 8 in the axial direction may include a plurality of systems of independent coil groups, and the excitation mechanism provided at the other side of the rotor 8 in the axial direction may include a single system of an independent coil group. Alternatively, each of the plurality of excitation mechanisms provided at both sides of the rotor 8 in the axial direction may include a plurality of systems of independent coil groups.

Other embodiments will be described. In the following description, in each embodiment, portions corresponding to the matters described in the preceding embodiments are designated by the same reference numerals, and the redundant description thereof is omitted. When only a part of a configuration is described, the remaining part of the configuration is the same as that of the previously described embodiment unless otherwise specified. The same advantageous effects are achieved by the same configuration. In addition to the combinations of portions described specifically in each embodiment, it is also possible to partially combine the embodiments unless any problem is particularly posed due to the combination.

Figure 3:
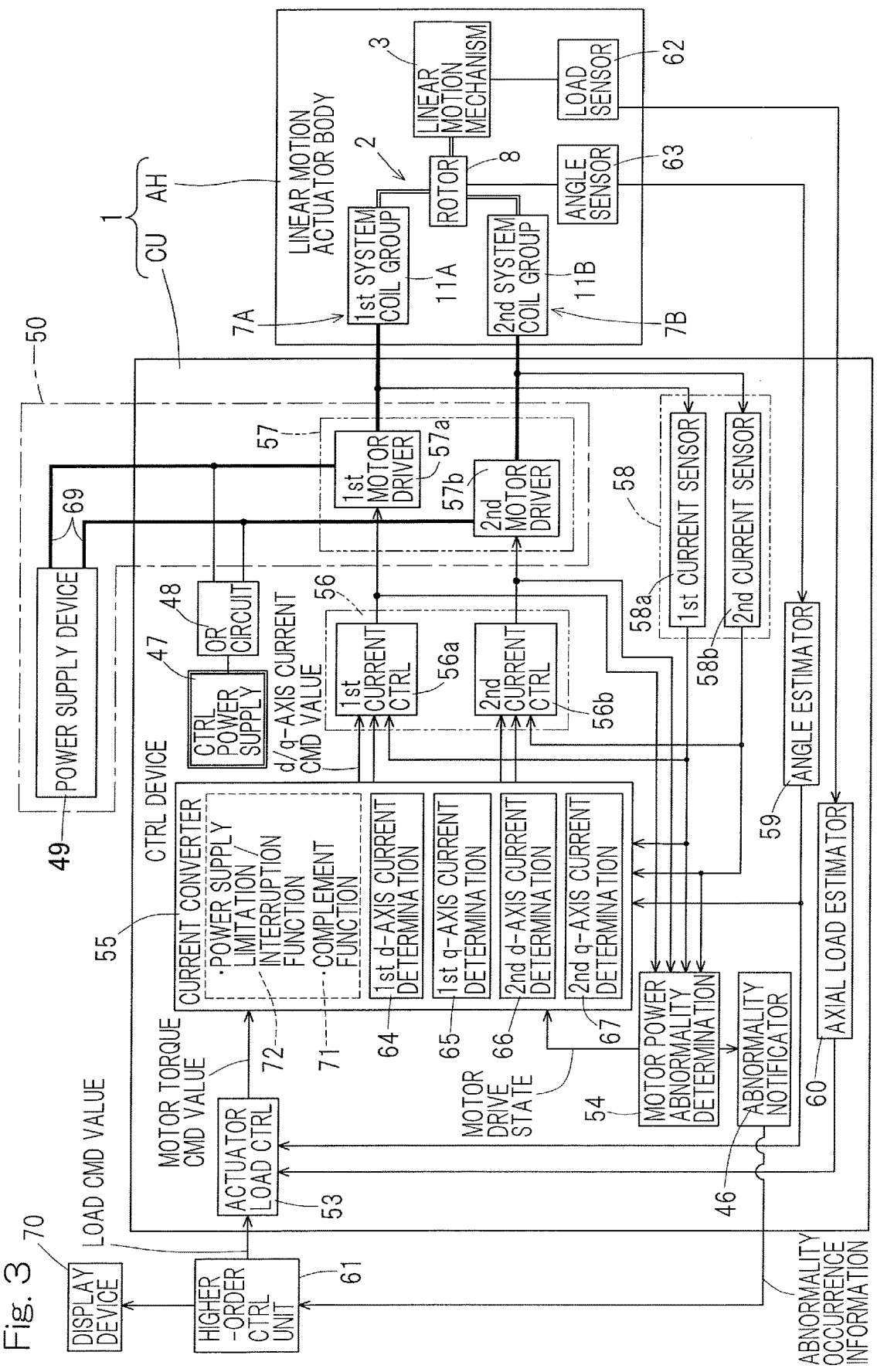
FIG. 3 is a block diagram showing an exemplary configuration of a control system for an electric linear motion actuator according to another embodiment of the present invention.

As shown in FIG. 3 regarding another embodiment, as the power supply system 50, one power supply device 49 may be provided, and only the transmission system between the power supply device 49 and the first and second motor drivers 57a, 57b may be multiplexed, i.e., made redundant. In this case, redundancy can be achieved when, for example, the power line 69 or a power supply harness (not shown) between the power supply device 49 and motor driver 57 is broken or short circuit occurs inside the motor driver 57. As compared with the configuration shown in FIG. 2, the number of power supply devices can be reduced, thereby achieving cost reduction. In addition, the same operation and effect as described with reference to FIGS. 1 and 2 are achieved.

FIG. 4 is a partial longitudinal sectional view of an electric brake device including any of the aforementioned electric linear motion actuators 1. This electric brake device basically includes: any of the aforementioned electric linear motion actuators 1; a brake rotor 44 as a rotation member which rotates integrally with a wheel; and friction pads (friction members) 43 which come into contact with the brake rotor 44 to generate a braking force. The electric brake device further includes a control device (not shown) for controlling the electric linear motion actuator. In the vehicle, a caliper 51 is provided so as to surround an outer peripheral side portion of the brake rotor 44. The caliper 51 is provided integrally with the housing 4 of the electric linear motion actuator 1.

A claw portion 52 is provided at an outboard-side end portion of the caliper 51. The claw portion 52 is opposed to an outboard-side side surface of the brake rotor 44 in the axial direction. The outboard-side friction pad 43 is supported by the claw portion 52. In the caliper 51, the inboard-side friction pad 43 is supported at an outboard-side end of the linear motion portion 6 of the linear motion mechanism 3. This friction pad 43 is opposed to an inboard-side side surface of the brake rotor 44 in the axial direction. The electric linear motion actuator 1 actuates the friction pads 43 so as to come into contact with the brake rotor 44 or separate from the brake rotor 44.

A mount (not shown) is supported by a knuckle (not shown) in the vehicle. A pair of pin support pieces (not shown) are provided at opposite end portions of the mount in the longitudinal direction. At end portions of the respective pin support pieces, slide pins (not shown) extending parallel to the axial direction are provided. The caliper 51 is slidably supported by these slide pins in the axial direction.

The control device controls rotation of the electric motor of the electric linear motion actuator 1 in accordance with an operation amount of a brake pedal (not shown). During braking, the inboard-side friction pad 43 comes into contact with the brake rotor 44 and presses the brake rotor 44 in the axial direction, through actuation by the electric linear motion actuator 1. The counterforce of the pressing force causes the caliper 51 to slide toward the inboard side. Thus, the outboard-side friction pad 43 supported by the claw portion 52 of the caliper 51 comes into contact with the brake rotor 44. The brake rotor 44 is firmly held from both sides thereof in the axial direction by the outboard-side and inboard-side friction pads 43, 43, whereby a braking force is applied to the brake rotor 44.

According to this configuration, since space saving of the electric linear motion actuator 1 can be achieved, the electric brake device can be mounted on a vehicle in which the mount space for the electric linear motion actuator 1 is extremely limited. Accordingly, versatility of the electric brake device can be increased, and the electric brake device can be mounted on various types of vehicles.

The rotor, in which the holding portion made of a non-magnetic material holds the permanent magnet, has less loss, and thus is considered to be suitable. However, the holding portion made of a magnetic material may hold the permanent magnet. The rotor, without using the holding portion, may have a configuration in which a single magnet magnetized with a plurality of axial magnetic poles is directly fixed to the rotation input/output shaft. Alternatively, for example, a configuration of a reluctance motor using an iron core having a shape that causes a stator inductance to change with rotation of the rotor, may be adopted.

As for the permanent magnet of the rotor, when a magnet that penetrates the rotor in the axial direction is used and both surfaces of the magnetic pole is used as interlinkage magnetic flux, the magnet volume, the motor size, and the number of components can be reduced, thereby achieving cost reduction and space saving. Alternatively, a configuration in which magnets are bonded to both surfaces of a magnetic body to improve heat resistance, may be adopted.

As the conversion mechanism part of the linear motion mechanism, various screw mechanisms such as a ball screw, a mechanism using a slope such as a ball ramp, etc., may be adopted instead of the planetary rollers. The thrust bearing shown in FIG. 1 is arranged on the assumption that an object is pressed by the electric linear motion actuator. However, the thrust bearing may be arranged so as to hold a load on a side axially opposite to the side in FIG. 1, to configure an actuator that applies a tensile load to an object.

While the sensor for detecting a motor angle and an axial load of the linear motion mechanism is provided, a sensor-less angle estimator which estimates a motor angle from a motor voltage, or an estimator for estimating an axial load from actuator efficiency and a motor current or the like, may be adopted, for example. Components such as a thermistor and wiring parts of electric systems, which are necessary for application of the electric linear motion actuator, are provided as appropriate.

The power supply limitation/interruption function section may interrupt supply of power to one excitation mechanism when the state of power supply to this excitation mechanism has been determined to be abnormal. In the electric brake device, components such as a redundancy mechanism, a power supply system, a sensor, etc., which are necessary for an electric brake, are provided as appropriate. Furthermore, while a plurality of feedback loops are configured for control calculation, the configuration of the control system may be appropriately determined according to need. For example, a single feedback system which collectively deals with electromagnetic characteristics and kinematic characteristics of the electric motor, may be adopted. The electric linear motion actuator according to each embodiment mentioned above may also be applied to equipment other than an electric brake device, such as a press apparatus.

The preferred embodiments have been described above with reference to the accompanying drawings. However, various additions, modification, and deletions can be made within the gist of the present invention. Accordingly, such additions, modification, and deletions are also included in the scope of the present invention.

REFERENCE NUMERALS

1 . . . electric linear motion actuator
2 . . . electric motor
3 . . . linear motion mechanism
5 . . . rotation input/output shaft
7 . . . stator
7A . . . first excitation mechanism
7B . . . second excitation mechanism
8 . . . rotor
11A . . . first system coil group
11B . . . second system coil group
50 . . . power supply system
54 . . . motor power abnormality determination section
60 . . . axial load estimator (axial load estimating function section)
71 . . . complement function section
72 . . . power supply limitation/interruption function section
CU . . . control device

What is claimed is:
1. An electric linear motion actuator comprising:
an electric motor;
a linear motion mechanism having a rotation input/output shaft and configured to convert rotary motion of the electric motor to linear motion of a linear motion portion via the rotation input/output shaft; and
a control device configured to control the electric motor, wherein
the linear motion mechanism and the electric motor are arranged in line along the same axis, which is an axis of the rotation input/output shaft of the linear motion mechanism,
the electric motor includes a stator and a rotor which are arranged such that directions of magnetic poles thereof for generating interlinkage magnetic flux contributing to generating a torque are parallel to a rotation shaft of the electric motor, the rotor has respective torque generating surfaces at both faces in an axial direction of the rotor, the stator has a plurality of excitation mechanisms arranged on both sides in the axial direction of the rotor, respectively, the plurality of excitation mechanisms including independent coil groups in such a manner that one or more systems of the independent coil groups are provided for one of the excitation mechanisms in the axial direction, and thus two or more systems of the independent coil groups are provided in total for both the excitation mechanisms in the axial direction, and a power supply system configured to independently supply power to the independent coil groups is provided.

2. The electric linear motion actuator as claimed in claim 1, wherein the control device includes a motor power abnormality determination section configured to determine whether or not a state of power supply to each excitation mechanism is normal, on the basis of a predetermined relationship of current and voltage in the excitation mechanism.

3. The electric linear motion actuator as claimed in claim 2, wherein the motor power abnormality determination section determines whether or not the state of power supply to each excitation mechanism is normal, on the basis of information including a comparison between a predetermined relationship of average current and average voltage in the plurality of excitation mechanisms, and a predetermined relationship of current and voltage in each excitation mechanism.

4. The electric linear motion actuator as claimed in claim 2, wherein the control device includes:
a power supply limitation/interruption function section configured to, when the motor power abnormality determination section has determined that the state of power supply to one of the excitation mechanisms is abnormal, limit or interrupt supply of power to the one excitation mechanism; and a complement function section configured to complement a torque that is reduced due to the limitation or interruption of supply of power to the one excitation mechanism, by the other excitation mechanism whose power supply state has been determined to be normal by the motor power abnormality determination section.

5. The electric linear motion actuator as claimed in claim 4, wherein the control device has an axial load estimating function section configured to estimate a magnitude of an axial load caused by linear motion of the linear motion portion of the linear motion mechanism, and the power supply limitation/interruption function section limits a motor current so that a current applicable to the electric motor is smaller than that in a case where the supply of power is not limited or interrupted, when the state of power supply to the one excitation mechanism has been determined to be abnormal and the axial load estimated by the axial load estimating function section is smaller than a predetermined magnitude.

* * * * *